United States Patent [19]

Tzifkansky et al.

[11] Patent Number: 4,600,117
[45] Date of Patent: Jul. 15, 1986

[54] FOOD CONTAINER

[75] Inventors: Guy Tzifkansky, Fontenay Aux Roses; Jean-Claude Marchais, L'Hay Les Roses, both of France

[73] Assignee: CIDELCEM, Paris, France

[21] Appl. No.: 755,989

[22] Filed: Jul. 17, 1985

[30] Foreign Application Priority Data

Jul. 20, 1984 [FR] France ................................ 84 11574

[51] Int. Cl.⁴ .............................................. B65D 51/16
[52] U.S. Cl. ..................................... 220/366; 220/360
[58] Field of Search ......................... 220/366, 360, 356

[56] References Cited

U.S. PATENT DOCUMENTS

| | | | |
|---|---|---|---|
| 1,953,765 | 4/1934 | McCluney | 220/366 |
| 2,241,064 | 5/1941 | Harbison | 220/360 |
| 2,552,642 | 5/1951 | Morrison, Jr. | 220/366 X |
| 2,836,462 | 5/1958 | Wenner | 220/366 X |
| 4,058,214 | 11/1977 | Mancuso | 220/366 X |

*Primary Examiner*—Steven M. Pollard
*Attorney, Agent, or Firm*—Sughrue, Mion, Zinn, Macpeak, and Seas

[57] ABSTRACT

A food container comprises a bottom (3) which is substantially rectangular and which has outwardly flared walls (4) rising therefrom and terminating in a substantially rectangular opening (7). The tops of the walls are outwardly surrounded by a horizontal rim (5) which is rectangular in shape and they are capped by a vertical rib (6) extending above the rim (5). The container has a cover (2) having a horizontal rim (8) and a vertical rib (9) extending downwardly therefrom suitable for engaging around the vertical rib (6) of the container (1). The vertical ribs (6, 9) being of substantially the same height on the container (1) and the cover (2). The vertical rib (6) on the container (1) is provided with notches (12) on at least two sides thereof, and the vertical rib (9) of the cover is provided with outwardly offset lengths (16) of reduced height disposed opposite the notches (12) in one position of the cover (2) and not disposed opposite the notches (12) in a second position of the cover (2).

3 Claims, 13 Drawing Figures

FOOD CONTAINER

FIELD OF THE INVENTION

The present invention relates to a vertically upwardly open food container having a substantially rectangular horizontal bottom and flared upright walls terminating in a substantially rectangular opening and including a horizontal rim near the top thereof which is outwardly rectangular in cross-section and which surrounds the opening to the container, and a vertical rib extending the walls above the rim, said container being provided with a a planar horizontal cover including firstly a horizontal rim beyond the container opening and secondly a vertical rib projecting beneath the rim and engaging around the vertical rib of the container, with the vertical rib of the container having substantially the same height as the vertical rib of the cover.

BACKGROUND OF THE INVENTION

One such container is described in French patent specification No. 80-21565.

Such a container is effectively proof against external splashes of liquid which may occur after it has been filled.

Further, the cover is easily lifted off the container even though it does not include a handle which could cause difficulty when cleaning.

It has been observed that to ensure good conservation of food in the container, it is necessary either to have very slight ventilation or else considerably greater ventilation depending on the nature of the food.

Thus, fresh or cooked vegetables require slight ventilation whereas raw meat requires greater ventilation.

SUMMARY OF THE INVENTION

A container according to the invention allows a single cover to provide both types of ventilation, and includes the improvement whereby the vertical rib of the container is fitted with notches on at least two sides of the container while the vertical rib of the cover includes lengths which are disposed adjacent the notches in one position of the cover and which are offset from the notches in another position of the cover, said lengths being disposed to the outside of said notches and the bottom edges or said lengths being situated at a lower level than the bottoms of the notches, but higher than the horizontal rim of the container.

Thus, when the said lengths are opposite the notches air circulates between the bottom edge of said lengths and the rim of the cover and then through the notches. In contrast, when said lengths are not opposite the notches only a slight air flow takes place due to leaks between the vertical rib of the cover and the rim of the container and between the vertical rib of the container and the cover.

According to an improvement of the invention, the bottom face of the cover is provided with a second vertical rib parallel to the said vertical rib, the said second vertical rib serving to hold condensation water, thereby preventing possible sealing due to the condensation water occupying the space between the cover and the rib of the container when the cover is in the low ventilation position, and also preventing too fast dehydration of the stored food when the cover is in the high ventilation position.

According to another improvement of the invention, the top face of the cover includes a raised portion going all the way round the cover and being interrupted at one point, said raised portion being disposed around a rectangle which is larger than the bottom of the container, and whose height lies between the heights of the first and second ribs situated on the bottom face of the cover, thereby enabling covers to be stacked on one another and also enabling containers to be stacked on covers.

It is thus possible to store covers on their own in a stack of covers and it is also possible to store closed containers in a stack of closed containers with each higher container being received on each lower cover.

BRIEF DESCRIPTION OF THE DRAWINGS

An embodiment of the invention is described by way of example with reference to the accompanying drawings in which.

MORE DETAILED DESCRIPTION

The upwardly open container 1 (see FIG. 1) is provided with a cover 2.

Figure 4:
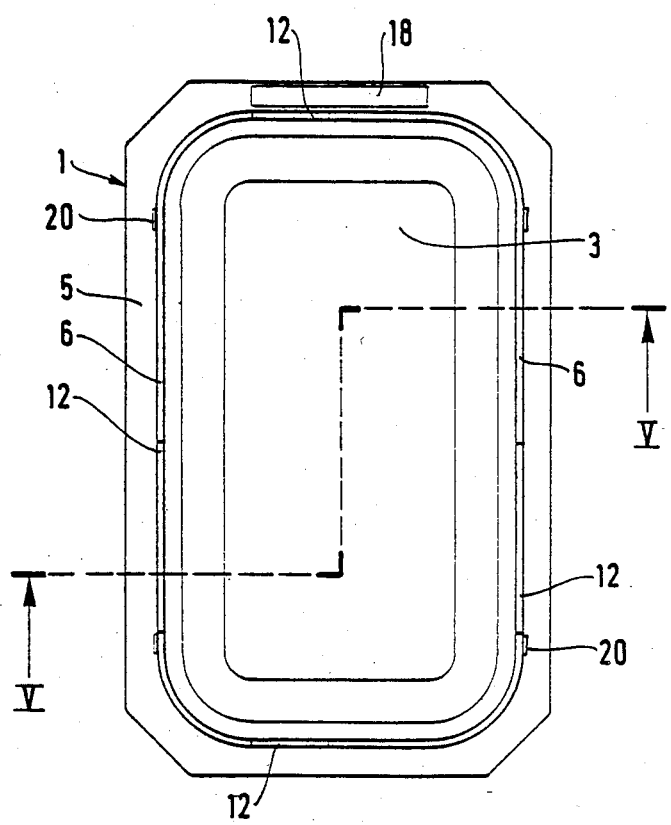
FIG. 4 is a plan view of a container in accordance with the invention.
Figure 5:
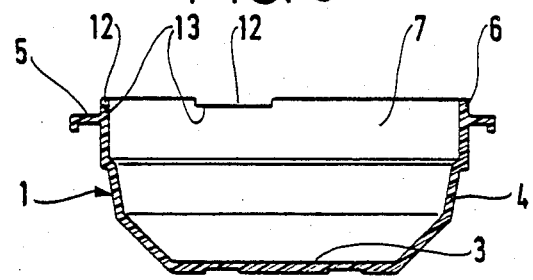
FIG. 5 is a section through the FIG. 4 container on a line V—V.

The container 1 (see FIGS. 4 and 5) comprises a flat bottom 3 which is generally rectangular in shape having rounded corners together with upright walls 4 rising therefrom in a flared configuration.

The top portions of the walls 4 are surrounded by an integral horizontal rim 5. The walls 4 are themselves extended upwardly by a vertical rib 6 which delimits a generally rectangular opening 7 having rounded corners.

The vertical rib 6 is provided with a notch 12 in each of the container sides at the opening 7. The notches 12 have bottom edges 13 which are horizontal. The notches 12 in the short sides are on the same side of a longitudinal axis through the container and the notches 12 in the long sides are on the same side of a transverse axis through the container.

Figure 6:
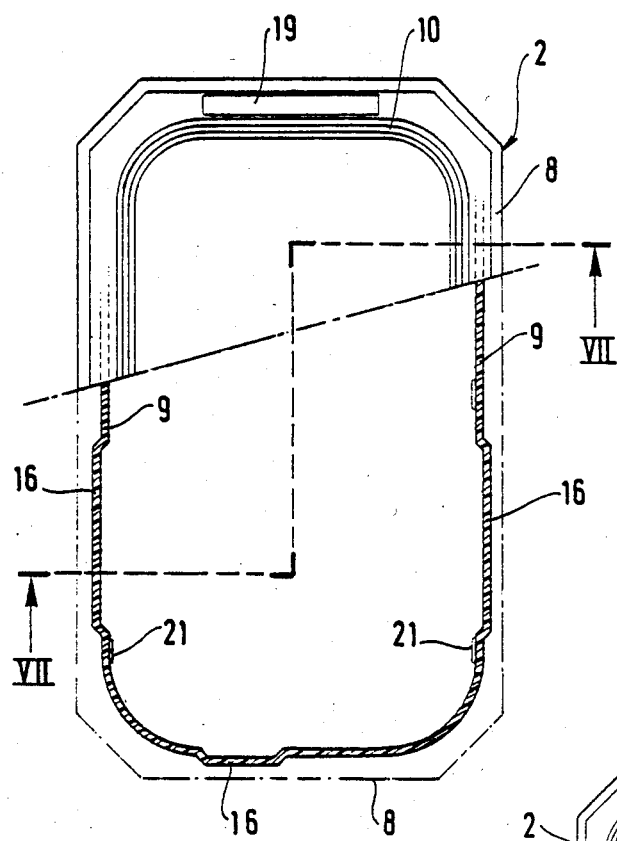
FIG. 6 is a partially cut-away plan view of a cover.
Figure 7:
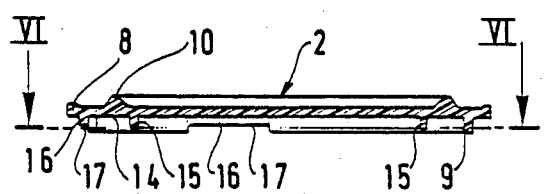
FIG. 7 is a section through the cover on a line VII—VII in FIG. 6.

The cover 2 (see FIGS. 6 and 7) comprises a rim 8 which extends above the rim 5 when the cover 2 is placed on the container 1.

Figure 1:
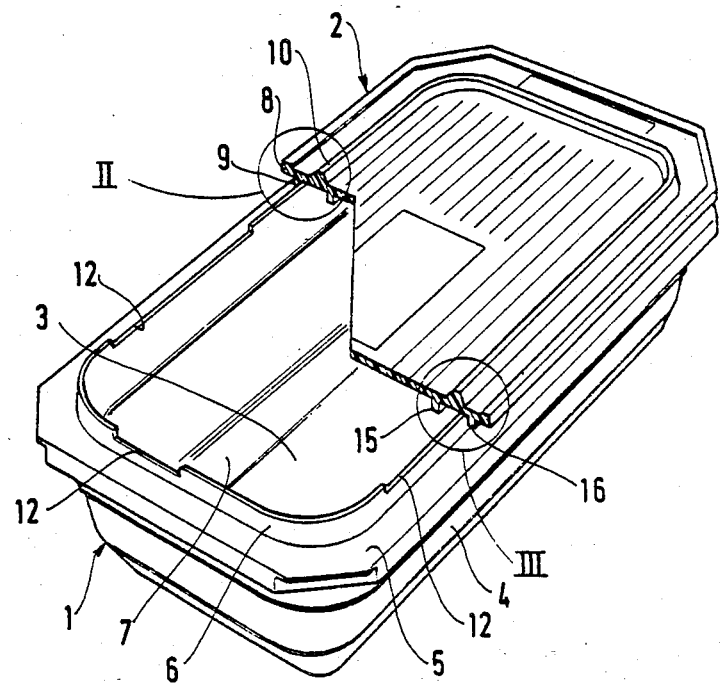
FIG. 1 is a partially cut-away perspective view of a food container in accordance with the invention having its cover in the high ventilation position.
Figure 9:
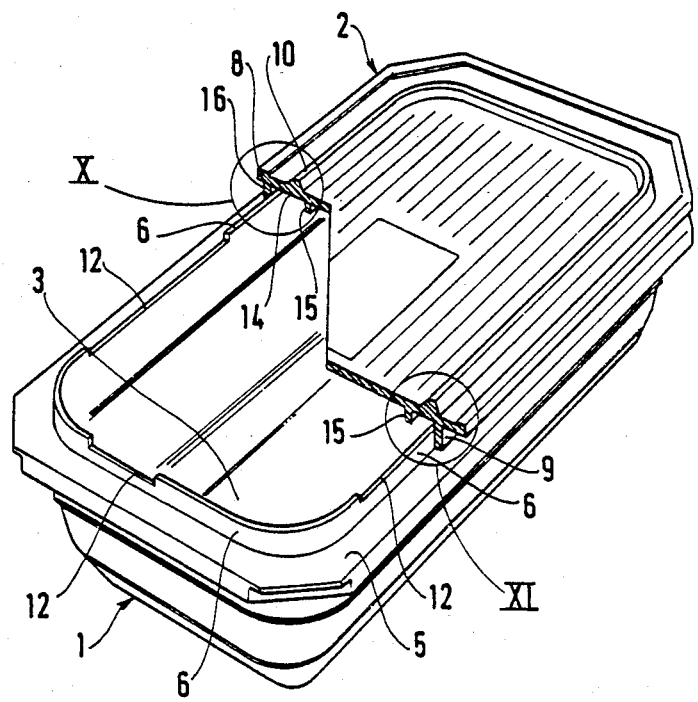
FIG. 9 is a perspective view of the food container with its cover in the low ventilation position.
Figure 10:
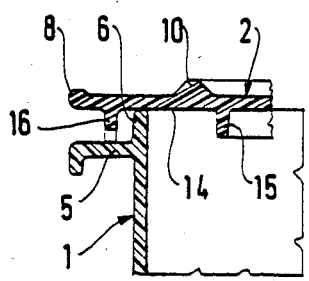
FIGS. 10 and 11 are sections on an enlarged scale of details of FIG. 9.
Figure 11:
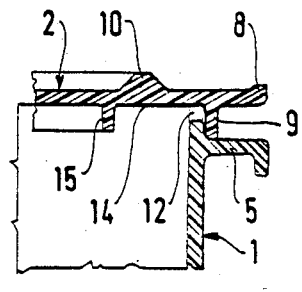

The bottom face 14 of the cover 2 is substantially plane and is provided with a vertical rib 9 of substantially the same height as the vertical rib 6, and which is disposed around the rib 6 when the cover is placed on the container (see FIGS. 1 and 9).

The bottom face 14 further includes a second downwardly directed rib 15 which is parallel to the rib 9 and which is disposed inwardly therefrom, in order to stop the condensation water which collects on the bottom surface of the cover from flowing into the gap between the cover and the rib 6 of the container. The second vertical rib 15 on the cover is smaller than its first vertical rib 9.

The cover 2 has an upwardly extending portion 10 on its top face, which portion extends around the cover following a rectangle with rounded corners which is larger than the bottom 3 of the container 1 and which is larger than the rectangle followed by the second rib 15 of the cover, but which is smaller than the rectangle followed by the first rib 9 on the bottom face of the cover 2.

The raised portion 10 includes a corner gap (not shown) in order to facilitate drip-drying the cover 2.

It is thus possible to place the bottom of a container on the top of a cover 2 since the bottom is located inside the raised portion. It is also possible to stack covers on one another since the raised portion 10 of a lower cover is received between the first and second ribs 9 and 15 on an upper cover.

The first or outer rib 9 is provided with four lengths 16 which are outwardly offset, and which in one position of the cover 2 on the container 1 are opposite the notches 12 (see FIGS. 1, 2, 3 and 8).

The bottom edge 17 of said lengths 16 is situated below the bottom edge 13 of the associated notches 12 but above the rim 5 of the container.

Figure 3:
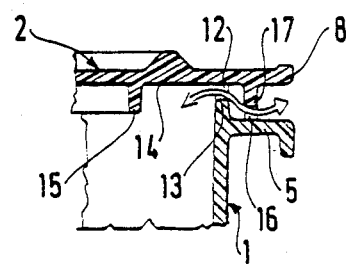

Thus, when said outwardly offset portions 16 are disposed opposite the corresponding notches 12, air may pass between the bottom edge 17 of such a length 16 and the rim 5 and then through the notch 12 into the container (or vice versa, see FIG. 3).

Figure 2:
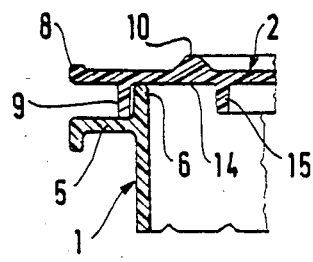
FIGS. 2 and 3 are cross-section views on an enlarged scale showing details of FIG. 1.

However, apart from said lengths 16, the rib 6 and the bottom face 14 of the cover 2 and/or the rib 9 and the rim 5 of the container engage one another in such a manner as to allow only small air leakage (see FIG. 2).

So long as said four outwardly offset lengths 16 are opposite the corresponding notches 12, considerable air flow may take place. Further, given that the bottom edges 17 of said lengths 16 are lower than the bottom edges 13 of the notches 12, the inside of the container is protected against splashes of liquid from the outside.

When the cover 2 is removed from the container and turned through 180° (see FIG. 13) to occupy a second position (see FIGS. 9, 10, 11 and 12) the outwardly offset lengths 16 are no longer oppposite the corresponding notches 12.

Figure 8:
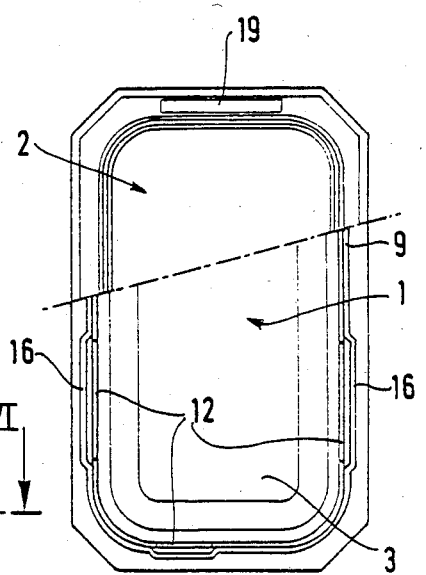
FIG. 8 is a plan view of a food container partially covered by a cover in the high ventilation position.
Figure 12:
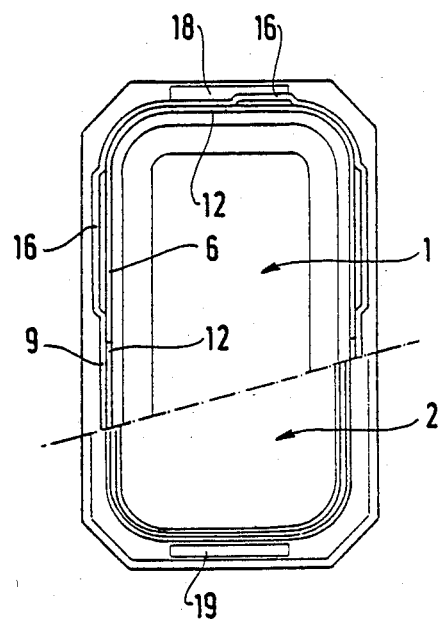
FIG. 12 is a plan view of a food container partially covered with its cover in the low ventilation position.
Figure 13:
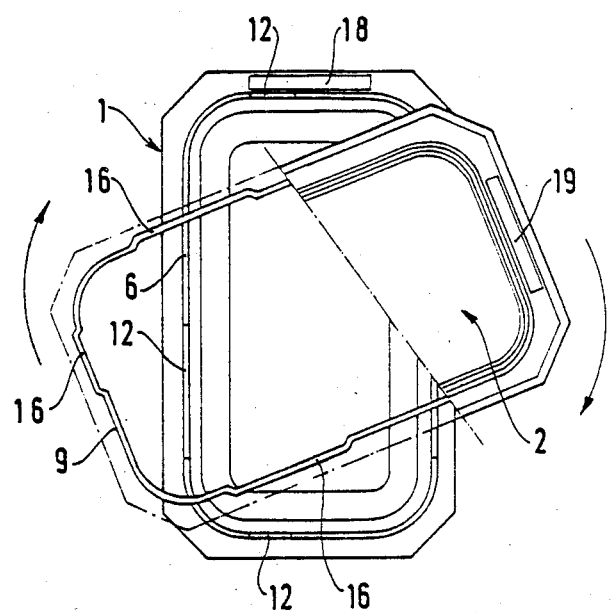
FIG. 13 is a plan view of the container showing its cover being rotated from the FIG. 8 position to the FIG. 12 position.

In order to distinguish between these two positions, a reference mark 18 is applied to the container 1 and a reference mark 19 is applied to the cover 2 (see FIGS. 8, 12 and 13).

In the second position the reference marks are at opposite ends (FIG. 12).

Further, the notches 12 are adjacent the first rib 9 on the cover (see FIG. 11) while the outwardly offset lengths 16 on the cover are adjacent the un-notched portions of the rib 6. As a result only small air leakage can take place in this second position.

The rib 6 may be provided with four inwardly directed tongues 20 for co-operating with corresponding tongues 21 on the cover rib 9 in order to snap-fasten the cover 2 on the container 1.

The container described above is rectangular, but clearly it could be square. If a square container is used, it would be possible for the second position (low ventilation) to be at 90° from the first position (high ventilation) rather than at 180° as shown.

We claim:

1. A vertically upwardly open food container having a substantially rectangular horizontal bottom and flared upright walls terminating in a substantially rectangular opening and including a horiziontal rim near the top thereof which is outwardly rectangular in cross-section and which surrounds the opening to the container, and a vertical rib extending the walls above the rim, said container being provided with a horizontal cover overlying said opening including firstly a horizontal rim and secondly a vertical rib projecting beneath the rim and engaging around the vertical rib of the container, with the vertical rib of the container having substantially the same height as the vertical rib of the cover, the container including the improvement whereby the vertical rib of the container is fitted with notches on at least two sides of the container while the vertical rib of the cover includes lengths which are disposed adjacent the notches in one position of the cover and which are not disposed adjacent the notches in another position of the cover, said lengths being disposed to the outside of said notches and the bottom edges of said lengths being situated at a lower level than the bottoms of the notches, but higher than the horizontal rim of the container.

2. A food container according to claim 1, wherein the bottom face of the cover is provided with a second rib which is situated parallel to and inside the first rib.

3. A food container according to claim 2, wherein the top face of the cover includes a raised portion surrounding the cover and including a gap at one point, said raised portion being disposed around a rectangle which is larger than the bottom of the cover and larger than the rectangle traced by the second rib of the cover, but which is smaller than the rectangle traced by the first rib of the cover, thereby enabling covers to be stacked on one another and also enabling containers to be stacked on covers.

* * * * *